(12) United States Patent
Schepers et al.

(10) Patent No.: US 10,685,096 B2
(45) Date of Patent: Jun. 16, 2020

(54) HIDING OF A PROGRAM EXECUTION

(71) Applicant: KONINKLIJKE PHILIPS N.V., Eindhoven (NL)

(72) Inventors: Hendrik Jan Jozef Hubertus Schepers, Veldhoven (NL); Paulus Mathias Hubertus Mechtildis Gorissen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 213 days.

(21) Appl. No.: 15/535,734

(22) PCT Filed: Dec. 8, 2015

(86) PCT No.: PCT/EP2015/078894
§ 371 (c)(1),
(2) Date: Jun. 14, 2017

(87) PCT Pub. No.: WO2016/102180
PCT Pub. Date: Jun. 30, 2016

(65) Prior Publication Data
US 2018/0357396 A1    Dec. 13, 2018

(30) Foreign Application Priority Data

Dec. 22, 2014 (EP) .................................. 14199750

(51) Int. Cl.
*G06F 21/12* (2013.01)
*G06F 21/14* (2013.01)
(Continued)

(52) U.S. Cl.
CPC .............. *G06F 21/125* (2013.01); *G06F 8/30* (2013.01); *G06F 21/14* (2013.01); *G06F 21/602* (2013.01); *H04L 9/002* (2013.01); *H04L 2209/16* (2013.01)

(58) Field of Classification Search
CPC ............................. G06F 21/14; H04L 2009/16
See application file for complete search history.

(56) References Cited

U.S. PATENT DOCUMENTS 7,383,443 B2   6/2008   Zeman et al.
7,809,135 B2   10/2010  Johnson et al.
(Continued)

FOREIGN PATENT DOCUMENTS

CN    104123503 A    10/2014
JP    2008269398 A   11/2008
(Continued)

OTHER PUBLICATIONS

Collberg et al: "A Taxonomy of Obfuscating Tranformations"; Technical Report Department of Computer Science, University of Auckland, No. 148, Jul. 1997, pp. 1-36.
(Continued)

*Primary Examiner* — Dao Q Ho

(57) ABSTRACT

A system for hiding a change to a set of variables of a program is provided. A value representing means (902) represents a value $w_i$ of a variable $v_i$ of the variables $v_1, v_2, \ldots, v_n$, wherein w is an element of a set W, by means of a representation $r_i$ wherein $r_i = E(W_i, \sigma_i)$, and $r_i$ is an element of a set of representations $\Omega(w_i) = \{E(vv_i,s)|s \in \Sigma\}$, wherein $\sigma_i$ is a state variable that is an element of a set $\Sigma$ and that provides a redundancy to the representation $r_i$ of $w_i$ and E is a one-to-one cryptographic mapping from W×Σ to a predetermined set. An action representing means (903) represents an action on values of variables in a subset V' of V by means of an action on V' and an action on V\V', to obtain updated representations. The action on V' changes the representation $r_j$ of each variable $V_j$ in the set of variables.

$$r_i = \mathbb{E}(w_i, \sigma_i) \qquad (I)$$

$$\Omega(w_i) = \{\mathbb{E}(w_i, s) | s \in \Sigma\} \qquad (II)$$

$$\mathbb{E} \qquad (III)$$

14 Claims, 3 Drawing Sheets

(51) Int. Cl.
    *H04L 9/00*      (2006.01)
    *G06F 8/30*      (2018.01)
    *G06F 21/60*     (2013.01)

(56) References Cited

U.S. PATENT DOCUMENTS

| | | | |
|---|---|---|---|
| 8,874,028 | B2 | 10/2014 | Nakagawa |
| 8,971,526 | B2 | 3/2015 | Coron |
| 2010/0115287 | A1* | 5/2010 | Betouin ................ G06F 21/125 |
| | | | 713/189 |
| 2010/0199354 | A1 | 8/2010 | Eker et al. |
| 2010/0251378 | A1 | 9/2010 | Eker et al. |
| 2013/0232323 | A1* | 9/2013 | Lerouge ................ G06F 21/14 |
| | | | 712/233 |
| 2014/0215225 | A1 | 7/2014 | Koliesnik |

FOREIGN PATENT DOCUMENTS

| | | |
|---|---|---|
| JP | 2011018119 A | 1/2011 |
| WO | 0077597 A1 | 12/2000 |
| WO | 2006140401 A1 | 6/2006 |
| WO | 2009108245 A2 | 9/2009 |
| WO | 2013104969 A1 | 7/2013 |
| WO | 2014095772 A1 | 6/2014 |
| WO | 2014096117 A1 | 6/2014 |

OTHER PUBLICATIONS

Park et al: "Encrypted Execution"; Research on Software Analysis for Error-Free Computing, Rosaec Memo, Feb. 11, 2014, pp. 1-11.

* cited by examiner

HIDING OF A PROGRAM EXECUTION

CROSS-REFERENCE TO PRIOR APPLICATIONS

This application is the U.S. National Phase application under 35 U.S.C. § 371 of International Application No. PCT/EP2015/078894, filed on Dec. 8, 2015, which claims the benefit of European Patent Application No. 14199750.2 filed on Dec. 22, 2014. These applications are hereby incorporated by reference herein.

FIELD OF THE INVENTION

The invention relates to hiding of details of a program execution. More particularly, the invention relates to hiding a conditional operation. More particularly, the invention relates to hiding a program flow and data flows in a program containing a conditional computation.

BACKGROUND OF THE INVENTION

Computing with encrypted values, not using operators which reveal their functionality, may be realized with a table driven approach. The program code, i.e. its operation, can be hidden through the use of look-up tables. Applying these tables to encrypted data gives an encrypted result, the outcome of the hidden operation. However, recognizing operators like comparisons (<, =, ... ) is fairly easy since those instructions are limited in number, typically result in a change in the control flow, and their outcome is of type encrypted Boolean. If this encrypted Boolean guards a conditional operation, e.g. in the case of an if-then or if-then-else construct, an attacker could recognize from the control flow aspects of the operation. Further, an attacker could create an ordering on the encrypted values that were compared. Eventually, this could lead to breaking the encryption.

In a software program it is often necessary to perform a comparison. For instance, to check if a certain threshold value has been reached or if some input is equal to a predetermined value. In obfuscated programs, such comparisons may help an attacker to break the encoding.

U.S. Pat. No. 7,809,135 B2 discloses methods and systems related to increasing the cryptographic security of keys used by software with cryptographic functions. This is done by increasing the mathematical complexity of the software. The components and functions used by the software are first determined and, using these components, functions, and the data exchanged between them, the software is made more resistant to analysis. The methods used in increasing analytical resistance are grouped into 3 general types: adjusting the information exchanged between the components, replacing some components with different but related components, and adjusting the data flow between the components.

SUMMARY OF THE INVENTION

It would be advantageous to have an improved method and system to prevent information to leak from a program during execution of the program.

To address this issue, in a first aspect a system for hiding a change to a set of variables $V=\{v_1, v_2, \ldots, v_n\}$ of a program is provided. The system comprises:

a value representing means for representing a value $w_i$ of a variable $v_i$ of the variables $v_1, v_2, \ldots, v_n$, wherein $w_i$ is an element of a set W, by means of a representation $r_i$, wherein $r_i = \mathbb{E}(w_i, \sigma_i)$, and $r_i$ is an element of a set of representations $\Omega(w_i) = \{\mathbb{E}(w_i, s) | s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set; and an action representing means for representing an action on values of a subset V' of V by an action on V' and an action on V\V', wherein the action on V' changes the representation $r_j$ of each variable $v_j$ in the set of variables V' according to a changed value $w'_j$ of variable $v_j$, so that $r_j = \mathbb{E}'(w'_j, \sigma_j)$, wherein $\mathbb{E}'$ is a one-to-one cryptographic mapping from $W \times \Sigma$ to a predetermined set, and wherein the action on V\V' changes the representation $r_k$ of each variable $v_k$ in V\V' according to a changed value $\sigma'_k$ of $\sigma_k$, so that $r_k = \mathbb{E}'(w_k, \sigma'_k)$.

Using this system, it is difficult for an attacker to discover which of the variables were actually changed in the program, because the representations of the variables that have not changed are also altered, by changing the state variable $\sigma$.

For example, the action comprises an if-statement, that defines an action on a set of variables $V_1$ if a condition holds, and an action on a set of variables $V_2$ if the condition does not hold, wherein the set of variables V is the union of $V_1$ and $V_2$, so that $V = V_1 \cap V_2$, and the action representing means is configured to use the set of variables $V_1$ or the set of variables $V_2$ as the set of variables V' according to whether the condition holds. This helps to avoid leaking information about the conditional and which branch of a conditional code segment was chosen. The action representing means may use the chosen set V' when representing the action on the subset V' by the action on V' and the action on V\V', as described above.

The set of variables $V_1$ and the set of variables $V_2$ may have an intersection $V_3$ of variables that are affected by both the actions, so that $V_3 = V_1 \cap V_2$, wherein the action changes each variable $v_m$ of the set $V_3$ according to a function $f$ if the condition holds and according to a function $g$ if the condition does not hold, wherein the action representing means is configured to determine the representation $r'_m = \mathbb{E}'(w'_m, \sigma'_m)$ of each variable $v_m$ of the set $V_3$ such that based on whether the condition holds according to the input, either:

$$w'_m = f_m(w_m) \text{ and } \sigma'_k = g_m(h_m(w_m, \sigma_m)), \text{ or}$$

$$w'_m = g_m(w_m) \text{ and } \sigma'_k = f_m(h_m(w_m, \sigma_m)), \text{ or}$$

wherein $h_m$ is a mapping from $W \times \Sigma$ to W.

Using this feature, it is difficult for an attacker to discover whether $f_m$ was actually applied to the variable $w_m$ or $g_m$ was applied to the variable $w_m$.

The action representing means may be configured to cause a look-up of the representations $r'_i$ corresponding to an input regarding the condition and the representations $r_i$ using at least one look-up table that maps a tuple of the input regarding the condition and the representations $r_i$ to the corresponding representations $r'_i$. The input may, for example, comprise an (optionally encrypted) Boolean variable. Alternatively, the input may comprise variables occurring in a predicate that defines the condition. This predicate and the actual actions may be hidden in the at least one look-up table.

In a particular example, $|\Sigma| = |W|$, and the action representing means (103) is configured to identify one or more input variables which determine the condition b, and wherein the action representing means (103) comprises a swap unit (305) for performing a hidden swap operation, based on at least one representation r, wherein $r=r_i$, of a variable $v_i$ in the set V, and the one or more input variables, such that for $p \in W$ and $q \in W$ with $r = \mathbb{E}(p,q)$, $$r'' = \begin{cases} \mathbb{E}''(p, q) & \text{if } b \text{ holds} \\ \mathbb{E}''(q, p) & \text{if } b \text{ does not hold} \end{cases},$$

wherein $\mathbb{E}''$ is a one-to-one cryptographic mapping from $W \times \Sigma$ to a predetermined set, wherein $\mathbb{E}''$ is different from $\mathbb{E}$, wherein r'' is a representation, and/or a swap unit (306) for performing a hidden swap operation, based on a representation r''' and the one or more variables, such that for $p \in W$ and $q \in W$ with $r''' = \mathbb{E}'''(p,q)$, $$r' = \begin{cases} \mathbb{E}'(p, q) & \text{if } b \text{ holds} \\ \mathbb{E}'(q, p) & \text{if } b \text{ does not hold} \end{cases},$$

wherein $\mathbb{E}'''$ is a one-to-one cryptographic mapping from $W \times \Sigma$ to a predetermined set, wherein $\mathbb{E}'''$ is different from $\mathbb{E}'$, and r' is the updated representation $r'_i$.

These swap operations can be used as pre-processing and/or post-processing steps, respectively, when computing the representation r', so that the hidden implementation of the actual functions $f$ and/or g can be simplified. If only one of the swap units is used, the role of w and σ before and after the action may be interchanged. This may be dealt with by taking this into account in the remainder of the system, for example by suitable program code that assumes that the encoding $\mathbb{E}$ has changed.

The action representing means may further comprise a function evaluation unit for computing a function to obtain the representation r''' based on the representation r'', such that for $p \in W$ and $q \in W$ with $r'' = \mathbb{E}(p,q)$, $$r''' = \mathbb{E}'''(f(p), g(q)),$$

wherein $f$ is a mapping defined on W and g is a mapping defined on W.

This way, the functions $f$ and g may be applied to the w or σ aspect of representation r'', depending on the swap operation performed before, so that the hidden implementation of $f$ and g can be the same regardless of whether the condition holds. The swap operation that may be performed thereafter swaps the w and a aspects back depending on the condition, to undo the swap operation performed by the first swap operation.

In a particular example, $\mathbb{E}'' = \mathbb{E}$. This means, that the two swap operations use identical cryptographic encodings. Thus, the same code and/or tables may be re-used for both swap operations.

In an example, $h_m(w, \sigma) = \sigma$, for all values of w and a and at least one m in $\{1, 2, 3, \ldots, n\}$. This may provides a simplified and/or more symmetric implementation.

In an example, the action on V' is configured to change the representation r of each variable $v_j$ in the set of variables V' so that $w'_j = f_j(w_j)$ and $\sigma'_j = \sigma_j$, and wherein the action on V\V' is configured to change the representation $r_k$ of each variable $v_k$ in V\V' so that $w'_k = w_k$ and $\sigma'_k = f_k(h_k(w_k, \sigma_k))$;

wherein $f_i$, for $i=1, 2, \ldots, n$, is a function defined on W and $h_k$, for each variable $v_k$ in V\V', is a function mapping elements of $W \times \Sigma$ to W.

This is an example of what changes to make to the representations.

The system of claim 2 or 3, further comprising a nested conditional representing means for representing a nested conditional operation involving a first plurality of nested conditions into a functionally equivalent sequence of non-nested conditional operations involving a second plurality of conditions.

The system may further comprise a converting unit for converting a nested conditional operation involving a first plurality of nested conditions into a functionally equivalent sequence of non-nested conditional operations involving a second plurality of conditions. This helps to improve the prevention of information leakage, because each of the non-nested conditional operations is evaluated, for example by means of the code generated by the first and second generating units, so that all expressions occurring in the conditional operations are evaluated and may influence the representation r'. Fewer branches are skipped.

For example, the converting unit may be configured to combine respective expressions of respective conditional branches of the nested conditional operation into terms of an auxiliary expression, wherein the respective expressions are associated with alternative values to be assigned to a particular variable; repeat the step to combine respective expressions of respective conditional branches into terms of an auxiliary expression, such that a plurality of auxiliary expressions is generated in which the terms are combined in different ways, generate code to evaluate the auxiliary expressions and store their results; and generate code to combine the results of the auxiliary expressions in dependence on a combined condition, wherein the combined condition is a combination of the plurality of conditions, such that the terms corresponding to branches that are not relevant in view of the condition cancel out. Such a system can be used to hide nested if statements by flattening these to a sequence of if statements that are not nested. By combining expressions occurring in different conditional branches into auxiliary expressions, and then combining the auxiliary expressions in such a way that expressions that are not relevant in view of the conditions cancel out, many of the expressions are evaluated in the program and may influence the encrypted outcome, making it difficult to analyze which expressions actually influence the decrypted value w' corresponding to the encrypted outcome.

The action representing means may be configured to identify at least one conditional operation of the sequence of non-nested conditional operations and the corresponding condition of the second plurality of conditions, and wherein the action representing means is configured to use the identified conditional operation as the action and the identified corresponding condition as the condition of the if-statement. Such a combination provides particularly good hiding of what happens in a piece of conditional code. Further, the identifying unit may be configured to identify each conditional operation of the sequence of non-nested conditional operations and each corresponding condition of the second plurality of conditions, wherein the first generating unit and the second generating unit are configured to process each identified conditional operation and corresponding condition.

In another aspect, a method is provided for hiding a change to a set of variables $V = \{v_1, v_2, \ldots, v_n\}$ of a program, the method comprising representing a value $w_i$ of a variable $v_i$ of the variables $v_1, v_2, \ldots, v_n$, wherein w is an element of a set W, by means of a representation $r_i$, wherein $r_i = \mathbb{E}'(w'_i, \sigma'_i)$, and $r_i$ is an element of a set of representations $\Omega(w_i) = \{\mathbb{E}(w_i, s) | s \in \Sigma\}$, wherein $\sigma_i$ is a state variable that is an element of a set $\Sigma$ and that provides a redundancy to the representation $r_i$ of $w_i$, and $\mathbb{E}'$ is a one-to-one cryptographic mapping from $W \times \Sigma$ to a predetermined set; and representing an action on values of a subset V' of V by means of an action on V' and an action on V\V', to obtain updated representations $r'_i = \mathbb{E}'(w'_i, \sigma'_i)$, for $i=1, 2, \ldots, n$, wherein $\mathbb{E}'$ is a one-to-one cryptographic mapping from $W \times \Sigma$ to a predetermined set, and wherein the action on V' is configured to change the representation $r_j$ of each variable $v_j$ in the set of variables V' according to a changed value $w'_j$ of variable $v_j$, and the action on V\V' is configured to change the representation $r_k$ of each variable $v_k$ in V\V' according to a changed value $\sigma'_k$ of $\sigma_k$.

According to another aspect, a system for hiding a conditional operation is provided, the system comprising a representing unit for representing a value w, wherein w is an element of a set W, by means of a representation r, wherein $r = \mathbb{E}(w, \sigma)$, and r is an element of a set of representations $\Omega(w) = \{ \mathbb{E}(w, s) | s \in \Sigma \}$, wherein $\sigma$ is a state variable that is an element of a set $\Sigma$ and that provides a redundancy to the representation r of w, and $\mathbb{E}$ is a one-to-one cryptographic mapping from $W \times \Sigma$ to a predetermined set; and a deriving unit for deriving a representation r' of a value w' from the representation r based on an input regarding a condition, wherein w' is an element of the set W, wherein r' is an element of a set of representations $\Omega'(w') = \{ \mathbb{E}'(w', s) | s \in \Sigma \}$, wherein $r' = \mathbb{E}'(w', \sigma')$, wherein $\sigma'$ is a state variable that is an element of the set $\Sigma$ and that provides a redundancy to the representation r' of w', wherein $\mathbb{E}'$ is a one-to-one cryptographic mapping from $W \times \Sigma$ to a predetermined set, wherein based on whether the condition holds according to the input, either w' is associated with $f(w)$ or $\sigma'$ is associated with $f(h(w,\sigma))$, wherein $f$ is a nontrivial mapping defined on W, and h is a mapping from $W \times \Sigma$ to W.

The representing unit provides for a representation r that is a redundant representation of the value w. That is, any single value of w has many different representations r, because r can be any element of $\Omega(w)$. This means, that a change of r does not necessarily mean a change of w, because r could just be changed to a different element of $\Omega(w)$ for the same value of w. Such a representation allows a conditional operation, e.g. if condition b holds, update w to $w' = f(w)$, to be hidden. That is, if the condition indeed holds, the representation r is updated to become a representation r' that is a representation of $f(w)$, i.e. a member of the set $\Omega'(f(w))$. On the other hand, if the condition does not hold, the representation r is still updated, but to a different representation of the same value w, i.e. a (different) member of the set $\Omega'(w)$. Since in the latter case, the function $f$ is used to select the specific member of the set $\Omega'(w)$, the same function based on $f$ influences the operation that is performed and applied to the representation r regardless of whether the condition holds or not. Any entropy effect provided by the function $f$ is therefore propagated in the representation w' regardless of whether the condition holds. That is, even when an attacker would change the value r or the condition b and look at any effects thereof on the result r', it is still difficult to extract information about the program and its variables. Further, it is also difficult for a malicious observer to find out whether the function $f$ has been applied to the value w or not.

The determining unit may be configured to determine the representation $r' = \mathbb{E}'(w', \sigma')$ such that based on whether the condition holds according to the input, either w' is associated with $f(w)$ and $\sigma'$ is associated with $g(h(w,\sigma))$, or w' is associated with $g(w)$ and $\sigma'$ is associated with $f(h(w,\sigma))$, wherein g is a (nontrivial) mapping defined on W. This is particularly useful to create a hidden implementation of for example an if-statement that has an else part: if b then $w = f(w)$ else $w = g(w)$. Both functions $f$ and g influence the end result r', although only one of these functions influences the w portion, or the set $\Omega'$ from which the representation r' is selected. The other function merely influences which element of $\Omega'$ is selected. Therefore, only one of the functions $f$ and g (as determined by the condition) determines the underlying decrypted value w' of the representation r'.

The deriving unit may be configured to look up the representation r' corresponding to the input regarding the condition and the representation r, using at least one look-up table that maps a tuple of the input and the representation r to the corresponding representation r'. The implementation by means of look-up tables allows to prevent leaking any information involved in computing the condition from the input variables and the function $f$. Moreover, any if statement or jump instruction that depends on the condition can be avoided.

For example, $|\Sigma| = |W|$. The deriving unit may be configured to identify one or more variables which determine the condition b, and the deriving unit may comprises a swap unit for performing a hidden swap operation, based on the representation r and the one or more variables, such that for $p \in W$ and $q \in W$ with $r = \mathbb{E}(p,q)$, $$r'' = \begin{cases} \mathbb{E}''(p, q) & \text{if } b \text{ holds} \\ \mathbb{E}''(q, p) & \text{if } b \text{ does not hold} \end{cases},$$

wherein $\mathbb{E}''$ is a one-to-one cryptographic mapping from $W \times \Sigma$ to a predetermined set, wherein $\mathbb{E}''$ is different from $\mathbb{E}$, wherein r'' is a representation, and/or performing a hidden swap operation, based on a representation r''' and the one or more variables, such that for $p \in W$ and $q \in W$ with $r''' = \mathbb{E}'''(p,q)$, $$r' = \begin{cases} \mathbb{E}'(p, q) & \text{if } b \text{ holds} \\ \mathbb{E}'(q, p) & \text{if } b \text{ does not hold} \end{cases},$$

wherein $\mathbb{E}'''$ is a one-to-one cryptographic mapping from $W \times \Sigma$ to a predetermined set, wherein $\mathbb{E}'''$ is different from $\mathbb{E}'$.

These swap operations can be used as pre- and/or post processing steps, respectively, when computing the representation r', so that the hidden implementation of the actual functions $f$ and/or g can be simplified.

The deriving unit may further comprise a function evaluation unit for computing a function to obtain the representation r''' based on the representation r'', such that for $p \in W$ and $q \in W$ with $r'' = \mathbb{E}''(p,q)$, $$r''' = \mathbb{E}'''(f(p), g(q)),$$

wherein g is a mapping defined on W.

This way, the functions $f$ and g may be applied to the w or $\sigma$ aspect of representation r'', depending on the swap operation performed before, so that the hidden implementation of $f$ and g can be the same regardless of whether the condition holds.

For example, $h(w, \sigma) = \sigma$, for all values of w and $\sigma$. In this example, when the condition is not true, the $\sigma$ aspect of the representation is not influenced by the w aspect of the representation. This improves the symmetry of the scheme.

The determining unit may be configured to determine the representation $\mathbb{E}'(w',\sigma')$ such that based on the condition either: $w'=f(w)$ and $\sigma'=\sigma$, or $w'=w$ and $\sigma'=f(h(w,\sigma))$. This may be used to create a hidden implementation of for example an if statement that does not have an else part: if b then $w=f(w)$.

According to another aspect of the invention, a method of performing an operation conditionally is provided. The method comprises steps of representing a value w, wherein w is an element of a set W, by means of a representation r, wherein $r=\mathbb{E}(w,\sigma)$, and r is an element of a set of representations $\Omega(w)=\{\mathbb{E}(w,s)|s\in\Sigma\}$, wherein $\sigma$ is a state variable that is an element of a set $\Sigma$ and that provides a redundancy to the representation r of w, and $\mathbb{E}$ is a one-to-one cryptographic mapping from $W\times\Sigma$ to a predetermined set; and deriving a representation r' of a value w' from the representation r based on an input regarding a condition, wherein w' is an element of the set W, wherein r' is an element of a set of representations $\Omega'(w')=\{\mathbb{E}'(w',s)|s\in\Sigma\}$, wherein $r'=\mathbb{E}'(w',\sigma')$, wherein $\sigma'$ is a state variable that is an element of the set $\Sigma$ and that provides a redundancy to the representation r' of w', wherein $\mathbb{E}'$ is a one-to-one cryptographic mapping from $W\times\Sigma$ to a predetermined set, wherein based on whether the condition holds according to the input, either w' is associated with $f(w)$ or $\sigma'$ is associated with $f(h(w,\sigma))$, wherein $f$ is a nontrivial mapping defined on W, and h is a mapping from $W\times\Sigma$ to W.

According to another aspect of the invention, a system for creating computer code to perform an operation conditionally is provided. The system comprises an identifying unit for identifying a condition and a conditional operation $f$ that is to be performed on a variable w so that, if the condition holds, a variable w' is computed such that $w'=f(w)$, wherein w' is an element of the set W, and wherein $f$ is a mapping defined on W;

a first generating unit for generating first computer code, wherein the first computer code is configured to, when executed, represent the variable w, wherein w is an element of a set W, by means of a representation r, wherein $r=\mathbb{E}(w,\sigma)$ and r is an element of a set of representations $\Omega(w)=\{\mathbb{E}(w,s)|s\in\Sigma\}$, wherein $\sigma$ is a state variable that is an element of a set $\Sigma$ and that provides a redundancy to the representation r of w, and $\mathbb{E}$ is a one-to-one cryptographic mapping from $W\times\Sigma$ to a predetermined set; and a second generating unit for generating second computer code, wherein the second computer code is configured to, when executed, determine a representation r' of the value w' based on an input regarding the condition, wherein r' is an element of a set of representations $\Omega'(w')=\{\mathbb{E}'(w',s)|s\in\Sigma\}$, wherein $r'=\mathbb{E}'(w',\sigma')$, wherein $\sigma'$ is a state variable that is an element of the set $\Sigma$ and that provides a redundancy to the representation r' of w', wherein $\mathbb{E}'$ is a one-to-one cryptographic mapping from $W\times\Sigma$ to a predetermined set; and wherein, if the condition holds according to the input, $w'=f(w)$, and if the condition does not hold according to the input, $\sigma'=f(h(w,\sigma))$, wherein h is a mapping from $W\times\Sigma$ to W.

Such a system can be used to convert plain (non-hidden) operations into hidden code. For example, the system can be implemented as part of a compiler that generates hidden code. For example, the generated computer code can comprise machine code, pseudo code, or virtual machine code.

According to another aspect, a method of creating machine code to perform an operation conditionally is provided, the method comprising identifying a condition and a conditional operation $f$ that is to be performed on a variable w so that, if the condition holds, a variable w' is computed such that $w'=f(w)$, wherein w' is an element of the set W, and wherein $f$ is a mapping defined on W;

generating first computer code, wherein the first computer code is configured to, when executed, represent the variable w, wherein w is an element of a set W, by means of a representation r, wherein $r=\mathbb{E}(w,\sigma)$ and r is an element of a set of representations $\Omega(w)=\{\mathbb{E}(w,s)|s\in\Sigma\}$, wherein $\sigma$ is a state variable that is an element of a set $\Sigma$ and that provides a redundancy to the representation r of w, and $\mathbb{E}$ is a one-to-one cryptographic mapping from $W\times\Sigma$ to a predetermined set; and generating second computer code, wherein the second computer code is configured to, when executed, determine a representation r' of the value w' based on an input regarding the condition, wherein r' is an element of a set of representations $\Omega'(w')=\{\mathbb{E}'(w',s)|s\in\Sigma\}$, wherein $r'=\mathbb{E}'(w',\sigma')$, wherein $\sigma'$ is a state variable that is an element of the set $\Sigma$ and that provides a redundancy to the representation r' of w', wherein $\mathbb{E}'$ is a one-to-one cryptographic mapping from $W\times\Sigma$ to a predetermined set; and wherein, if the condition holds according to the input, $w'=f(w)$, and if the condition does not hold according to the input, $\sigma'=f(h(w,\sigma))$, wherein h is a mapping from $W\times\Sigma$ to W.

According to another aspect, a computer program product comprising instructions for causing a processor to perform one or more of the methods set forth above is provided.

It will be appreciated by those skilled in the art that two or more of the above-mentioned embodiments, implementations, and/or aspects of the invention may be combined in any way deemed useful.

Modifications and variations of the methods and/or the computer program product, which correspond to the described modifications and variations of the systems, can be carried out by a person skilled in the art on the basis of the present description.

BRIEF DESCRIPTION OF THE DRAWINGS

These and other aspects of the invention are apparent from and will be elucidated with reference to the embodiments described hereinafter.

DETAILED DESCRIPTION OF EMBODIMENTS

In the following, a description is given in how to improve encryption of data values and hiding the inner working of a program. Such techniques could be applied to create a secure virtual machine, for example. Also other kinds of systems can be protected against information leakage using the techniques disclosed herein. Throughout this document, the word hiding is used to indicate that a functionality of a program is difficult to find out, for example by reverse engineering. Obfuscating is another term used to indicate that it is difficult to find out what functional operations are performed in a program code.

Figure 1:
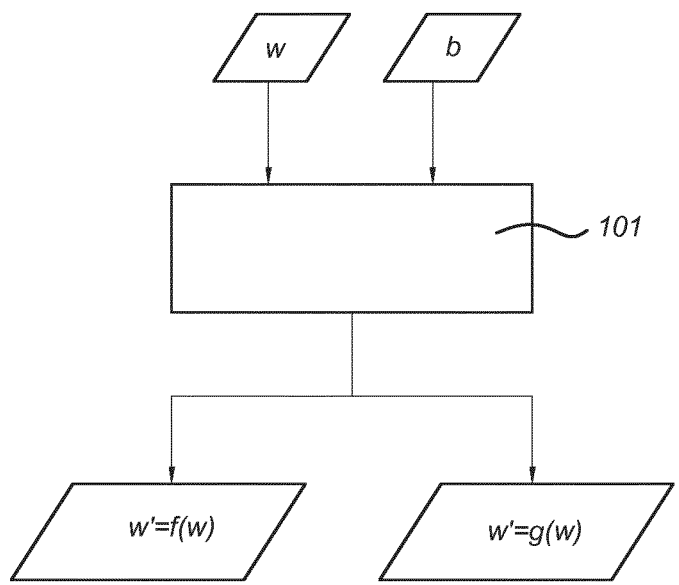
FIG. 1 is a block diagram of a system for performing a transformation depending on a condition.

FIG. 1 illustrates a system comprising a transformation unit 101 configured to perform a conditional operation. That is, the transformation unit 101 receives a value w and a condition b, and outputs w' depending on b. In case the condition b is true, the transformation unit outputs w'=f(w). In case condition b is false, the transformation unit 101 outputs w'=g(w). Herein, f and g are different functions. In an alternative arrangement, the transformation unit 101 is configured to receive some variables (not shown) instead of the condition itself, and the transformation unit 101 first evaluates an expression to determine whether the condition b is true based on these variables. After that the transformation unit 101 outputs w'=f(w) (if the condition is true) or w'=g(w) (if the condition is false). In the following, embodiments will be disclosed in which the values of w and w', and possibly b, are encrypted.

Figure 2:
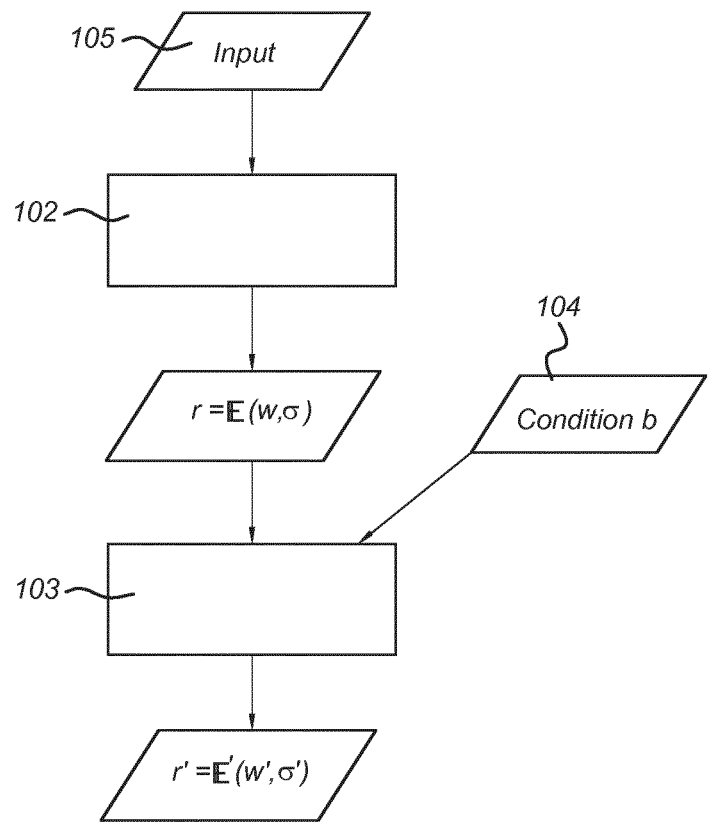
FIG. 2 is a block diagram of a system for hiding a conditional operation.

FIG. 2 illustrates a system for performing a conditional transformation in a hidden way. The system comprises a representing unit 102 for identifying a cryptographic representation of a value w. For example, the value of w is provided at an input 105 of the representing unit 102, and the representing unit 102 is configured to encrypt the value of w to generate the encrypted representation r of w. Alternatively, the representing unit 102 can be configured to receive the representation r as an input value 101, and forward the representation r to the deriving unit 103. In either case, an example relationship between the value w and its cryptographic representation r can be explained as follows.

Let W denote a set of operands (input values of an operation) that should be encoded. Define a finite set $\Sigma$ of states and a finite set V with cardinality equal to the product of the cardinalities of W and $\Sigma$. The elements of W×$\Sigma$ are mapped in a one-to-one manner to V by a secret encoding function $\mathbb{E}$. The encoded representatives of the element w∈W are the members of the set $$\Omega(w)=\{\mathbb{E}(w,\sigma)|\sigma\in\Sigma\}.$$

The number of representatives of each element w∈W thus equals the cardinality of $\Sigma$. As a result, data paths carrying symbols from V are equal (cardinality of $\Sigma$=1) or wider (cardinality of $\Sigma$>1) than data paths for carrying symbols from W. In other words, when the cardinality of $\Sigma$ is greater than one, there are more values that can represent any particular value of w, because the representation $\mathbb{E}(w,\sigma)$ depends not only on w, but also on a state variable $\sigma$ which does not necessarily have any meaning but can be chosen randomly. This state variable $\sigma$ is merely introduced to encrypt the value of w and hide any operations performed on w. Preferably, W=$\Sigma$, or at least the cardinality of W equals the cardinality of $\Sigma$. However, this is not a limitation.

Consider the function f: W→W to be encoded (or hidden). Construct a function F: V→V such that $\forall w\Sigma$ W and $\sigma\in\Sigma$ we have $F(\mathbb{E}(w,\sigma)\in\Omega(f(w))$. So F maps a representative of w to a representative of f(w). A general definition could be:

$$F(\mathbb{E}(w,\sigma))=\mathbb{E}(f(w),g(w,\sigma)). \quad \text{(Equation 1)}$$

In this example, the representative $\mathbb{E}(f(w), g(w,\sigma))$ of f(w) is in part determined by a function g (w,$\sigma$). That is, the state value associated with the representative of f(w) can depend on both the value w and the state $\sigma$ associated with the representative of w, using a relation g: W×$\Sigma$→$\Sigma$. In a particular example, g only depends on $\sigma$, so that g:$\Sigma$→$\Sigma$. However, the following is not limited to this particular example.

The value representation $\mathbb{E}(w,\sigma)$ and the encoding of an operation f(w) as defined in Equation 1 is thus further hidden using some mapping g. This mapping g can be different for each and every operation that occurs in a program. Accordingly, a plurality of instructions with respective operations $f_i$ introduce a corresponding plurality of instructions with, respectively, relations $g_i$. The execution order of the instructions with operations $f_i$ may induce an order of execution on the instructions with the relations $g_i$. In fact, apart from the calculation constituted by the operations $f_i$, a new calculation comes into existence to compute $g_i$. This latter calculation is referred to hereinafter as the $\sigma$ calculation or the $\sigma$ trajectory. Similarly, the encryption function $\mathbb{E}$ can be different for each and every operation in the program by introducing a sequence of respective encryption functions $\mathbb{E}_i(w,\sigma)$, so that the representation of any value w can be different after every operation. In such a case, Equation 1 generalizes to Equation 1a:

$$F_i(\mathbb{E}_i(w,\sigma))=\mathbb{E}_{i+1}(f_i(w),g_i(w,\sigma)). \quad \text{(Equation 1a)}$$

For the description of an instruction a symmetrical generalization of Equation 1 can be employed. Consider a function $q_0$: W×$\Sigma$→W, a relation $q_1$: W×$\Sigma$→$\Sigma$. Equation 1 can be generalized to:

$$F(\mathbb{E}(w,\sigma))=\mathbb{E}(q_0(w,\sigma),q_1(w,\sigma)). \quad \text{(Equation 2)}$$

In such a case, possibly partial information of f(w) in Equation 1 can be passed as part of $q_0$ or $q_1$. Two observations can be made. The first observation is that in a particular example, $q_0$ as well as $q_1$ could be encryptions and that $\mathbb{E}$ "only" combines the values. The second observation is that the role of w as value and $\sigma$ as state could be seen as diminishing. It suffices to be able to determine f(w) or w, g($\sigma$) or $\sigma$.

To obscure program flow, jump operations may be eliminated and replaced with alternative operations on the above-described representations. However, unlike in the case of if-conversion features of modern processor architectures, this if-conversion is not done to prevent a costly pipeline disruption, but to remove any observable change in the control flow. This way, an analysis of the control flow does not reveal any selections made in the program. Further, when encoding a conditional program such as "if Boolean b is true, then operation F else operation G", it can be ensured by means of the techniques disclosed herein that both branches ("operation F" and "operation G") contribute to $\mathbb{E}(w,\sigma)$, regardless of the outcome of the condition ("if Boolean b is true"). By doing so a statistical spread of the condition over the total program can be achieved. For example, the development of w is determined by the branch that corresponds to the outcome of the condition, the development of $\sigma$ is determined by the branch that does not correspond to the outcome of the condition.

Both w and $\sigma$ can be computed at the same time and/or can be inseparably connected to each other by means of $\mathbb{E}$. By analysis of the resulting data, neither the branch taken, nor the value of the condition can be determined. The jump operation that would be implemented in prior art based on the outcome of the conditional may be eliminated, thus making it difficult to extract information from control flow of the program. The value $\mathbb{E}(w,\sigma)$ can be made to depend on both branches of an if-then-else construction. In terms of information theory, the entropy of w and σ is spread very well.

For example, a program representation of the transformation performed by the transformation unit 101 of FIG. 1 may be as follows:

if $b$ then $w':=f(w)$ else $w':=g(w)$.

In the example embodiment shown in FIG. 2, the deriving unit 103 receives an encrypted representation r of a value w, as explained above, and input information regarding a condition b 104. This input information could be a Boolean or an encrypted Boolean variable. Alternatively, the input information could comprise one or more variables that can be combined, by e.g. the transformation unit 101, in a predicate that defines the condition.

The above conditional program of FIG. 1 can be re-programmed, by introducing redundancy using the state variable as described above, with $r=\mathbb{E}_i(w,\sigma)$ is the representation of the operand w, and r' is the representation of the outcome w', so that $r'=\mathbb{E}_{i+1}(w',\sigma')$, for some values of σ and σ'. The output of the deriving unit 103 can be summarized as follows:

if $b$ then $r':=\mathbb{E}_{i+1}(f(w),g(\sigma))$;

else $r':=\mathbb{E}_{i+1}(g(w),f(\sigma))$.

The operations $\mathbb{E}_{i+1}(f(w),g(\sigma))$ and $\mathbb{E}_{i+1}(g(w),f(\sigma))$ can each be implemented in form of a look-up table. However, to avoid execution of the if statement and corresponding conditional jump operation inside the deriving unit 103, it is possible to implement the deriving unit 103 by means of a look-up table that maps combinations of b and representation r directly to corresponding values of r'. Herein, b may be an encrypted Boolean variable. Moreover, b may be replaced with one or more input variables, wherein the condition b is a function of those variables. In such a case, combinations of these variables and representation r can be mapped by a look-up table to corresponding values of r'. In such a case, the function defining the condition b may be encoded together with f and g in the look-up table. Instead of a look-up table, a network of look-up tables may be used. Ways to implement a function as a network of look-up tables are known in the art by itself.

As can be seen from the above, both operations f and g have an influence on the representation r' regardless of the outcome of the conditional ("if b"). Therefore, both f and g contribute to the "entropy" of r', making it difficult to extract information from these conditional operations.

Figure 3:
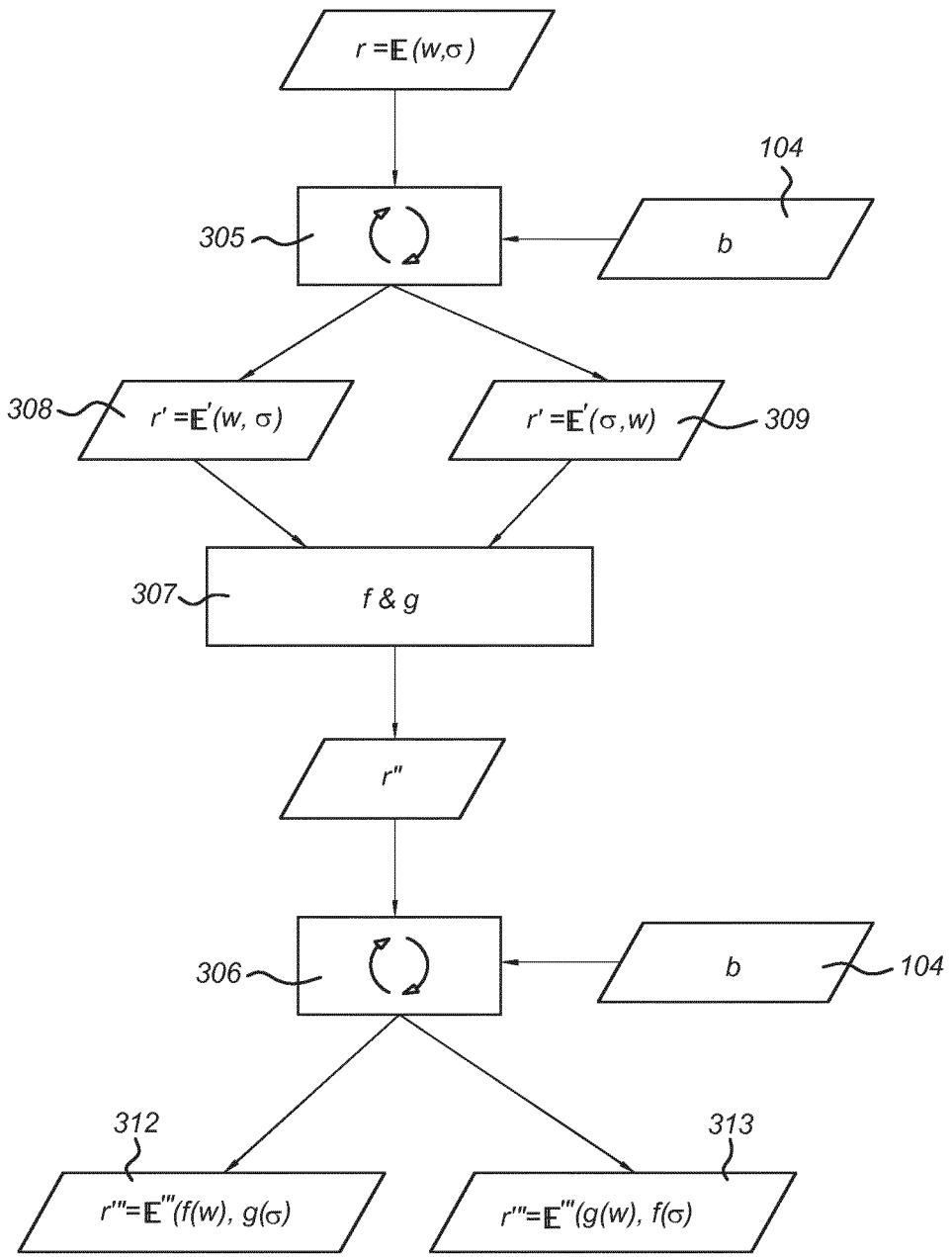
FIG. 3 is a block diagram of a deriving unit for hiding a conditional operation.

FIG. 3 illustrates an example implementation of the deriving unit 103. In this particular implementation, the if statement (or conditional jump operation) is replaced by two swap operations 305 and 306. Such a swap operation can be implemented, for example, in form of a look-up table. The operations described in each respective line of the following three lines may be implemented, for example, by a respective look-up table.

Input: $b$ and $r$, wherein $r=\mathbb{E}_i(w,\sigma)$.

line 1: if $b$ then $r':=\mathbb{E}_{i+1}(w,\sigma)$ else $r':=\mathbb{E}_{i+1}(\sigma,w)$ fi line 2: $r'':=\mathbb{E}_{i+2}(f_i(p),g_i(q))$.

line 3: if $b$ then $r''':=\mathbb{E}_{i+3}(u,v)$ else $r''':=\mathbb{E}_{i+3}(v,u)$ fi Output: $r'''$, wherein $r'''=\mathbb{E}_{i+3}(f_i(w),g_i(\sigma))$ or $r'''=\mathbb{E}_{i+3}(f_i(\sigma),g_i(w))$ Line 1 of the above code fragment explains the functionality of swap operation 305, which conditionally swaps the value (w) and state (σ) parts of the representation $r=\mathbb{E}_i(w,\sigma)$, based on the condition b (numeral 104). Line 2 of the above code fragment explains how the functions f and g are applied to the representation r' in block 307. Line 3 explains the functionality of swap operation 306, which again conditionally swaps the value (w) and state (σ) parts of the representation $r=\mathbb{E}_i(w,\sigma)$, based on the condition b (numeral 104).

Note that after line 1, r' can be either $\mathbb{E}_{i+1}(w,\sigma)$ or $\mathbb{E}_{i+1}(\sigma,w)$, depending on b. In line 2, the symbols p and q are defined such that $r'=\mathbb{E}_{i+1}(p,q)$. In line 2, the function f is effectively applied to w in case b is true. However, if b is not true, the function g is effectively applied to w, but due to the preceding swap operation of line 1, w has become is part of the 'state' or 'a' portion of the representation r'. Therefore, an additional swap operation is provided in line 3 to exchange the 'w' and the 'σ' portions of r'. In line 3, the symbols u and v are defined such that $r''=\mathbb{E}_{i+2}(u,v)$. That is, $u=f_i(p)$ and $v=g_i(q)$. In line 3, in case b is not true, the desired value, which was captured in the 'state' or 'a' portion of the representation r'', is moved to the 'w' portion of the representation r'''.

Lines 1 and 3 each denote a swap function. Such a swap function may be implemented as a look-up table, wherein the correct value is looked up based on the value of b and the representation r (or r'', respectively). It is possible to use the same look-up table for both line 1 and 3, by selecting $\mathbb{E}_i$, $\mathbb{E}_{i+1}$, $\mathbb{E}_{i+2}$, and $\mathbb{E}_{i+3}$ such that $\mathbb{E}_i=\mathbb{E}_{i+2}$ and $\mathbb{E}_{i+1}=\mathbb{E}_{i+3}$. It is also possible to encode the outcome of lines 1 to 3 in a single look-up table that directly maps the values of r and b to corresponding values of r'''.

Referring to FIG. 2, The deriving unit 103 that performs a hidden computation corresponding to this code fragment may also be configured to determine the output as follows:

Input: condition $b$ and representation $r$, wherein $r=\mathbb{E}_i(w,\sigma)$.

if $b$ then $r':=\mathbb{E}_{i+1}(f(w),g(h(w,\sigma)))$;

else $r':=\mathbb{E}_{i+1}(g(w),f(h(w,\sigma)))$.

Herein, h is a mapping from W×Σ to W. No swap operation is used in this case. Also, this implementation is suitable for cases where W≠Σ, or when the cardinality of W differs from the cardinality of Σ. It is possible to implement both branches of the if clause in form of a look-up table, and apply one of the look-up tables in dependence on the condition b. The functions f and g will influence the outcome r' regardless of the condition b. Alternatively, one look-up table may be implemented that maps tuples of b (or variables which determine b) and r onto corresponding representations r'.

A special case is that where there is no else branch in the non-hidden version of the program, i.e. consider a program if $b$ then $w':=f(w)$ end.

In that case the function g(w) of the previous examples is equal to the identity. That is, the determining unit 103 is configured to determine the representation $\mathbb{E}'(w',\sigma')$ such that based on the condition either:

$w'=f(w)$ and $\sigma'=\sigma$(when the condition is true), or $w'=w$ and $\sigma'=f(h(w,\sigma))$ (when the condition is false).

This does not pose a security risk per se as there is always some development and the entropic spread is maintained by applying the function $f$ either to w or to the state σ of the encrypted domain. However, this situation can be further improved by balancing both branches by inserting dummy operations for the variables that are not affected. Consider an operation "Balance", whose purpose is to further hide the program by balancing any if-statement, where different variables may be affected in dependence on a condition.

Balance(if $b$ then $\text{Assgn}_1$ else $\text{Assgn}_2$ fi;)=if $b$ then Balance($\text{Assgn}_1$,$\text{Assgn}_2$)else Balance($\text{Assgn}_2$, $\text{Assgn}_1$)fi;

wherein, for instance, Balance(x: =x+1, y: =$f$(5)) means x: =x+1; Dummy(y). Herein, Dummy(y) can represent any operation on a variable, which does not change that variable. For example, Dummy(y) can mean any one of:

$$y := y * 1, \quad y := y + 0, \quad y := \frac{5 * y}{2 + 3}.$$

Other dummy operations will be apparent to the person skilled in the art in view of the present disclosure.

In other words, a conditional code segment comprising a plurality of branches, wherein each branch is conditionally executed in dependence on a condition, can be 'balanced' by:
- determining a variable that is changed in at least one branch of the conditional branches, but not in at least one other branch of the conditional branches;
- creating a dummy operation for that determined variable;
- including the dummy operation into the at least one other branch of the conditional branches.

The above three steps may be repeated for each variable involved in the conditional branches.

Figure 4:
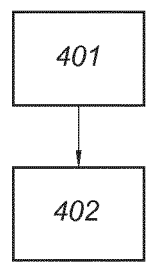
FIG. 4 is a flowchart of a method of hiding a conditional operation.

FIG. 4 illustrates a method of performing an operation conditionally. In step 401, a value w, wherein w is an element of a set W, is represented by means of a representation r, wherein r=$\mathbb{E}$ (w,σ), and r is an element of a set of representations $\Omega(w)=\{\mathbb{E}(w,s)|s\in\Sigma\}$, wherein σ is a state variable that is an element of a set Σ and that provides a redundancy to the representation r of w, and $\mathbb{E}$ is a cryptographic mapping from W×Σ to a predetermined set. This representation r could be received, for example. Alternatively, the representation can be generated from an input value w by determining a state variable σ as a random number and computing, or looking up, $\mathbb{E}$ (w,σ).

In step 402, a representation r' of a value w' is determined, wherein w' is an element of the set W, wherein r' is an element of a set of representations $\Omega'(w')=\{\mathbb{E}'(w',s)|s\in\Sigma\}$, wherein r'=$\mathbb{E}$'(w',σ'), wherein σ' is a state variable that is an element of the set Σ and that provides a redundancy to the representation r' of w', wherein $\mathbb{E}$' is a one-to-one cryptographic mapping from W×Σ to a predetermined set. For example, the value of r' is looked up in a look-up table based on one or more input variables that determine the condition b and the representation r. Optionally, a sequence of table lookups are performed, as described hereinabove, involving a swap operation, a function operation, and another swap operation. The tables are designed in such a way that in dependence on the condition b, either w' is associated with $f(w)$ or σ' is associated with $f(h(w,\sigma))$. Herein, $f$ is a mapping defined on W, and h is a mapping from W×Σ to W.

In a particular example, the above method applies $f$ to the 'w' portion of the encrypted representation r=$\mathbb{E}$ (w,σ), so that r'=$\mathbb{E}$'($f$(w), σ) based on the condition, for example if the condition is true. Otherwise, $f$ is applied to the 'σ' portion of r=$\mathbb{E}$ (w,σ), so that r'=$\mathbb{E}$'(w, $f$(h(w,σ))), for example if the condition is false. Further variants of the method may be provided, as explained above with reference to FIG. 1 to 3. For example, variants with an 'else' branch may be made such that based on the condition, either r'=$\mathbb{E}$'($f$(w), g(σ)) or r'=$\mathbb{E}$'(g(w), $f$(σ)).

Figure 5:
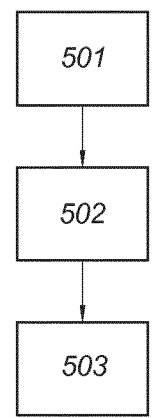
FIG. 5 is a block diagram of a system for creating machine code to perform an operation conditionally.

FIG. 5 illustrates a system for creating machine code to perform an operation conditionally. The system comprises an identifying unit 501 for identifying a condition and a conditional operation $f$ that is to be performed on a variable w so that, if the condition holds, a variable w' is to be computed such that w'=$f$(w), wherein w' is an element of the set W, and wherein $f$ is a mapping defined on W. For example, the identifying unit 501 may be connected to a parser module of a compiler (not shown), that extracts expressions of a computer program in order to identify the condition and the conditional operation.

The identifying unit 501 may provide the information regarding the identified condition and the conditional operation to a first generating unit 502 which generates machine code. The generated machine code, when executed, represents the variable w, wherein w is an element of a set W, by means of a representation r wherein r=$\mathbb{E}$ (w,σ) and r is an element of a set of representations $\Omega(w)=\{\mathbb{E}(w,s)|s\in\Sigma\}$, wherein σ is a state variable that is an element of a set Σ and that provides a redundancy to the representation r of w, and $\mathbb{E}$ is a one-to-one cryptographic mapping from W×Σ to a predetermined set. For example, the machine code may generate the representation r from the actual input value w and a random number σ. Alternatively, the machine code generated by the first generating unit 502 may, when executed, reference a memory location in which the representation is stored or receive the representation r from another software component or input device.

The system further comprises a second generating unit 503. The second generating unit 503 generates machine code for determining a representation r' of the value w', based on the representation r and an input regarding a condition, wherein r' is an element of a set of representations $\Omega'(w')=\{\mathbb{E}'(w',s)|s\in\Sigma\}$, wherein r'=$\mathbb{E}$'(w',σ'), wherein σ' is a state variable that is an element of the set Σ and that provides a redundancy to the representation r' of w', wherein $\mathbb{E}$' is a one-to-one cryptographic mapping from W×Σ to a predetermined set. If the condition holds, w'=$f$(w), and if the condition does not hold, σ'=$f$(h(w,σ)), wherein h is a mapping from W×Σ to W. The generating unit 503 may comprise a table generator (not shown) which generates one or more of the look-up tables, as described above, which may be used to implement the function. The system may be extended to generate the machine code necessary to perform the calculations or table look-ups as described above.

Figure 6:
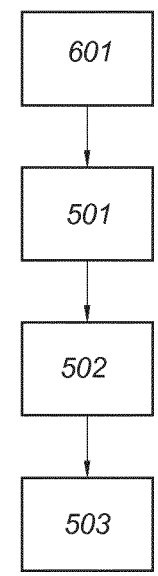
FIG. 6 is a block diagram of another system for creating machine code to perform an operation conditionally.

FIG. 6 illustrates a further embodiment of the system for generating machine code to perform an operation conditionally. Items that are similar as in FIG. 5 have been given the same reference numerals and do not need to be discussed again in detail. The system comprises a converting unit 601 for converting a nested conditional operation involving a plurality of conditions into a sequence of non-nested conditional operations. Specifically, the sequence of non-nested conditional operations with corresponding conditions is equivalent to the nested conditional operations, in the sense that the output value is the same. Further, the non-nested conditional operations with corresponding conditions may be processed by the identifying unit 501, and the code generating units 502 and 503.

Figure 7:
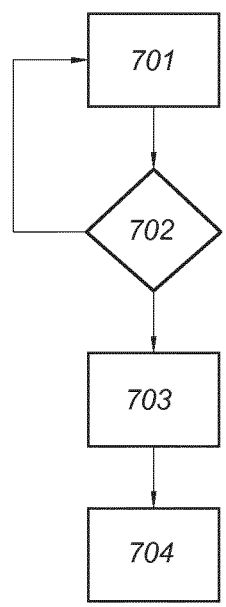
FIG. 7 is a flowchart of a method of converting a nested conditional operation.

FIG. 7 illustrates an example method of converting a nested conditional operation involving a plurality of conditions into a sequence of non-nested conditional operations. The converting unit 601 of FIG. 6 may be configured to perform the method illustrated in FIG. 7.

In step 701, respective expressions of respective conditional branches of the nested conditional operation are converted into terms of an auxiliary expression. These respective expressions are associated with alternative values to be assigned to a particular variable, in dependence on the condition. That is, the expressions are destined to be assigned to the same variable of the generated code, but the conditions determine which expression will finally be assigned to the variable. In step 702, if it is determined that the step 701 should be repeated, the flow returns to step 701, such that a plurality of auxiliary expressions is generated in which the terms are combined in different ways. If in step 702 it is determined that enough auxiliary expressions have been generated, such that each conditional operation is equivalent to a particular combination of the auxiliary terms, the method proceeds from step 703. In step 703, code is generated to evaluate the auxiliary expressions and storing their results. This step may involve generating code for evaluating a combination of at least one of the plurality of conditions. Next, in step 704, code is generated to combine the results of the auxiliary expressions in dependence on a combined condition, wherein the combined condition is a combination of the plurality of conditions, such that the terms corresponding to branches that are not relevant in view of the condition cancel out.

Consider again the conditional code segment "if b then F else G fi". The conditional branches F and G of such a statement may comprise multiple expressions, for example a sequence of operations, denoted for example as "$F_1; F_2$", contain loops, recursion, or an additional conditional code segment, such as an additional if-statement. The latter situation presents a nested Boolean guarded selection.

Define the program P as:

$$\text{if } b_1 \text{ then } \underbrace{\{\text{if } b_2 \text{ then } F \text{ else } G \text{ fi;}\}}_{P_1} \text{ else } \underbrace{\{\text{if } b_3 \text{ then } H \text{ else } J \text{ fi;}\}}_{P_2} \text{ fi;}$$

Now, there are four alternatives (F, G, H, and J), of which only one should be executed. When the above described techniques are applied to $P_1$ and $P_2$, the main branch which depends on $b_1$ is still not necessarily fully covered by the hidion technique.

One way to address this is to replace nested if statements by a sequence of non-nested if statements, and doing that in such a way that the expressions of each branch (F, G, H, J) are all evaluated in the process of executing this sequence of non-nested if statements.

To transform a program in this way, expressions may first be balanced by inserting dummy operations.

A systematic method may be applied to flatten the program so that it no longer contains nested if-clauses.

As we have seen before, our method works cryptographically best if the program is entropically fully balanced, especially the pair of branches of an if-clause.

In case a branch contains both (unconditional) assignments and one or more nested if-clauses we can "flatten" those by distributing a copy of such assignments in each branch of the if-clause as follows:

Flatten(if $b$ then $F$ else $G$ fi;$x:=x+1$)=if $b$ then $F;x:=x+1$ else $G;x:=x+1$ fi;

Flatten($x:=x+1$; if $b$ then $F$ else $G$ fi)=if $b$ then $x:=x+1;F$ else $x:=x+1;G$ fi;

Consider the following nested if-clause which is preferably balanced with respect to the variable x:

| | | |
|---|---|---|
| if | $b_0$ | |
| then | if | $b_1$ |
| | then | $x := \exp_0$; |
| | else | $x := \exp_1$; |
| | fi; | |
| else | if | $b_2$ |
| | then | $x := \exp_2$; |
| | else | $x := \exp_3$; |
| fi; | fi; | |

Herein, $\exp_0$, $\exp_1$, $\exp_2$, and $\exp_3$ are expressions that depend on x.

Introducing $p:=\exp_i+\exp_{i+1}$ and $q:=\exp_i-\exp_{i+1}$ as auxiliary variables this program can be transformed into:

| | |
|---|---|
| if | $b_0$ |
| then | $p := \exp_0 + \exp_1; q := \exp_0 - \exp_1;$ |
| | if $b1$ |
| | then $x: = \dfrac{p+q}{2};$ |
| | else $x: = \dfrac{p-q}{2};$ |
| | fi; |
| else | $p := \exp_2 + \exp_3; q := \exp_2 - \exp_3;$ |
| | if $b_2$ |
| | then $x: = \dfrac{p+q}{2};$ |
| | else $x: = \dfrac{p-q}{2};$ |
| | fi; |
| fi; | |

Since the continuations after the two second level if-clauses have now become identical, the program can be 'flattened' into:

| | |
|---|---|
| Program 1: | |
| if | $b_0$ |
| then | $p := \exp_0 + \exp_1; q := \exp_0 - \exp_1;$ |
| else | $p := \exp_2 + \exp_3; q := \exp_2 - \exp_3;$ |
| fi; | |
| if | $(b_0 \wedge b_1) \vee (b_0 \wedge b_2)$ |
| then | $x: = \dfrac{p+q}{2};$ |
| else | $x: = \dfrac{p-q}{2};$ |
| fi | |
| | or, using a multiplicative variant: |
| if | $b_0$ |
| then | $p: = \exp_0 * \exp_1; q: = \exp_0/\exp_1;$ |
| else | $p: = \exp_2 * \exp_3; q: = \exp_2/\exp_3$ |
| fi; | |
| if | $(b_0 \wedge b_1) \vee (b_0\ b_2)$ |
| then | $x: = \sqrt{p*q};$ |

Program 1:

```
else        x := √(p/q); ;
fi
```

The resulting two if-statements, may be implemented using the techniques in respect of encrypted representations r=$\mathbb{E}(w,\sigma)$ above. For example, for the first if-statement of Program 1 above, a representation r may be used to represent input variable x, and representations $r_1$ and $r_2$ may be used to represent p and q. A further representation may be used to represent the output x of the second if-statement of Program 1.

When if-statements are nested to a deeper level, then similar techniques may be applied to convert them to a series of sequential if-statements. For example, consider the following example program in which if statements are double nested:

```
if    b0
then  if    b1
      then  if    b2
            then  x := exp0;
            else  x := exp1;
            fi;
      else  if    b3
            then  x := exp2;
            else  x := exp3;
            fi;
      fi;
else  if    b4
      then  if    b5
            then  x := exp4;
            else  x := exp5;
            fi;
      else  if    b6
            then  x := exp6;
            else  x := exp7;
            fi;
      fi;
fi;
```

This example program may be converted into a series of non-nested if-statements. To do that, a two step approach may be adopted. First, similar to the case of single-nested if statements, the continuations from the third level if-clauses may be unified by introducing auxiliary variables p and q as follows: p:=$exp_i$+$exp_{i+1}$, and q:=$exp_i$−$exp_{i+1}$. This is illustrated in more detail in the following code:

```
if    b0
then  if    b1
      then  p := exp0 + exp1;
            q := exp0 − exp1;
            if    b2
            then  x := (p + q)/2;
            else  x := (p − q)/2;
            fi;
      else  p := exp2 + exp3;
            q := exp2 − exp3;
            if    b3
            then  x := (p + q)/2;
            else  x := (p − q)/2;
            fi;
      fi;
else  if    b4
      then  p := exp4 + exp5;
            q := exp4 − exp5;
            if    b5
            then  x := (p + q)/2;
            else  x := (p − q)/2;
            fi;
      else  p := exp6 + exp7;
            q := exp6 − exp7;
            if    b6
            then  x := (p + q)/2;
            else  x := (p − q)/2;
            fi;
      fi;
fi;
```

This program can be flattened to obtain the following code without any nested if-clauses:

```
if    b0
then  r := exp0 + exp1 + exp2 + exp3;
      s := exp0 + exp1 − exp2 − exp3;
else  r := exp4 + exp5 + exp6 + exp7;
      s := exp4 + exp5 − exp6 − exp7;
fi;
if    (b0 ^ b1) \/ (¬b0 ^ b4)
then  p := (r + s)/2;
else  p := (r − s)/2;
fi;
if    b0
then  v := exp0 − exp1 + exp2 − exp3;
      w := exp0 − exp1 − exp2 − exp3;
else  v := exp4 − exp5 + exp6 − exp7;
      w := exp4 − exp5 − exp6 − exp7;
fi;
if    (b0 ^ b1) \/ (¬b0 ^ b4)
then  q := (v + w)/2;
else  q := (v − w)/2;
fi;
if    (b0 ^ ((b1 ^ b2) \/ (¬b1 ^ b3))) \/ (¬b0 ^ ((b4 ^ b5) \/ (¬b4 ^ b6))))
then  x := (p + q)/2;
else  x := (p − q)/2;
fi;
```

The above conversion procedure to convert a program with double nested if clauses into a program with sequential, non-nested if clauses can be applied to any program that has the above format, for any expressions $exp_0$ to $exp_7$.

Figure 8:
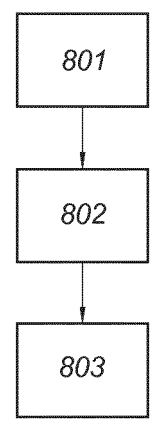
FIG. 8 is a flowchart of a method of creating machine code to perform a hidden operation conditionally.

FIG. 8 illustrates a method of creating computer code to perform an operation conditionally. Step 801 involves identifying a condition and a conditional operation $f$ that is to be performed on a variable w so that, if the condition holds, a variable w' is computed such that w'=$f$(w), wherein w' is an element of the set W, and wherein $f$ is a mapping defined on W. Step 802 involves generating first computer code, wherein the first computer code is configured to, when executed, represent the variable w, wherein w is an element of a set W, by means of a representation r, wherein r= $\mathbb{E}(w,\sigma)$ and r is an element of a set of representations $\Omega(w)=\{\mathbb{E}(w,s)|s\in\Sigma\}$, wherein σ is a state variable that is an element of a set Σ and that provides a redundancy to the representation r of w, and $\mathbb{E}$ is a one-to-one cryptographic mapping from W×Σ to a predetermined set. Step 803 involves generating second computer code, wherein the second computer code is configured to, when executed, determine a representation r' of the value w' based on an input regarding the condition, wherein r' is an element of a set of representations $\Omega'(w')=\{\mathbb{E}'(w',s)|s\in\Sigma\}$, wherein r'= $\mathbb{E}'(w',\sigma')$, wherein σ' is a state variable that is an element of the set Σ and that provides a redundancy to the representation r' of w', wherein $\mathbb{E}'$ is a one-to-one cryptographic mapping from $W \times \Sigma$ to a predetermined set; and wherein, if the condition holds according to the input, $w'=f(w)$, and if the condition does not hold according to the input, $\sigma'=f(h(w,\sigma))$, wherein h is a mapping from $W \times \Sigma$ to W.

The removal of jumps in a program may be used to prohibit analysis of the control flow or the values involved. Computing the computations made in all branches of an if-statement, even the branches that are not relevant in view of the condition, and combining the results of those computations in one data element, can help to reach this goal.

A system of table-driven machines in which jumping is suppressed may be created to remove changes in the control flow of a program, wherein the encoding in the form of $\mathbb{E}(w,\sigma)$ in the case of a Boolean guarded selection develops along the non-taken branch by at most $\sigma$ and along the taken branch by at least w.

Figure 9:
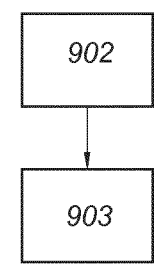
FIG. 9 is a block diagram of a system for hiding a change to a set of variables.

FIG. 9 illustrates a system for hiding a change to a set of variables $V=\{v_1, v_2, \ldots, v_n\}$ of a program. The system comprises a value representing means 902 for representing a value $w_i$ of a variable $v_i$ of the variables $v_1, v_2, \ldots v_n$, wherein w is an element of a set W, by means of a representation $r_i$, wherein $r_i = \mathbb{E}(w_i, \sigma_i)$, and $r_i$ is an element of a set of representations $\Omega(w_i) = \{\mathbb{E}(w_i,s) | s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set. This value representing means 902 may be implemented using techniques disclosed hereinabove. The value representing means 902 may be configured to represent all of the variables $v_1, v_2, \ldots, v_n$ by respective representations $w_1, w_2, \ldots, w_n$ in the specified way. The values of $\sigma_1, \sigma_2, \ldots, \sigma_n$ may be selected randomly, for example. The value representing means 902 may be configured to compute the representations $r_i$ based on the underlying values $w_i$. The value representing means 902 may also be configured to receive the representations $r_i$ from another device or from another component of the system. n is a positive integer. That is, in general the set of variables V contains at least one variable.

The system may further comprise an action representing means 903 for representing an action on values of variables in a subset V' of V by means of an action on V' and an action on V\V', to obtain updated representations $r'_i = \mathbb{E}'(w'_i, \sigma'_i)$, for $i=1, 2, \ldots, n$, wherein $\mathbb{E}'$ is a one-to-one cryptographic mapping from $W \times \Sigma$ to a predetermined set. $\mathbb{E}'$ may be equal to $\mathbb{E}$. Alternatively, $\mathbb{E}'$ may be a cryptographic mapping that is different from $\mathbb{E}$. Thus, it is possible to change the cryptographic mapping when changing the representation.

Further, the action representing means may be configured to perform the action on V' and the action on V\V'. Alternatively, the action representing means may be configured to merely represent these actions by generating program code that, when executed, performs the actions. In the latter case, the action representing means 903 may be configured to identify (e.g. by means of a parser) program code defining the action on the values of the variables in the subset V', and transform that program code into program code that defines the action on V' and the action on V\V'.

The action on V' is configured to change the representation $r_j$ of each variable $v_j$ in the set of variables V' according to a changed value $w'_j$ of variable $v_j$, and the action on V\V' is configured to change the representation $r_k$ of each variable $v_k$ in V\V' according to a changed value $\sigma'_k$ of state variable $\sigma_k$. In particular, the representation $r_k$ of each variable $v_k$ in V\V' is changed to a representation that represents the same value of $w_k$. The representation $r_j$ of each variable $v_j$ in the set of variables V' may be changed according to a changed value $w'_j$ of variable $v_j$, keeping the same value of $\sigma_j$ (or optionally a different value of $\sigma_j$).

The action can comprise an if-statement, that defines an action on a set of variables $V_1$ if a condition holds, and an action on a set of variables $V_2$ if the condition does not hold, wherein both $V_1$ and $V_2$ are subsets of V. In other words, the set of variables V comprises the union of $V_1$ and $V_2$, so that $V_1 \cup V_2 \subset V$. The action representing means 903 may be configured to use the set of variables $V_1$ as the set of variables V' if the condition holds. This means that the action representing means 903 performs the action on $V_1$ by changing the representation $r_j$ of each variable $v_j$ in the set of variables $V_1$ according to a changed value $w'_j$ of variable $v_j$, and performs the action on V\V$_1$ by changing the representation $r_k$ of each variable $v_k$ in V\V$_1$ according to a changed value $\sigma'_k$ of state variable $\sigma_k$.

Further, the action representing means 903 may be configured to use the set of variables $V_2$ as the set of variables V' if the condition does not hold. This means that the action representing means 903 performs the action on $V_2$ by changing the representation $r_j$ of each variable $v_j$ in the set of variables $V_2$ according to a changed value $w'_j$ of variable $v_j$, and performs the action on V\V$_2$ by changing the representation $r_k$ of each variable $v_k$ in V\V$_2$ according to a changed value $\sigma'_k$ of state variable $\sigma_k$.

Some of the variables may be changed by a conditional code segment, whether the condition holds or not. In such a case, the set of variables $V_1$ and the set of variables $V_2$ have an intersection $V_3$, wherein $V_3 = V_1 \cap V_2$. The action changes the value of each variable $v_m$ of the set $V_3$ according to a function $f_m$ if the condition holds and according to a function $g_m$ if the condition does not hold. The action representing means is configured to represent these actions by an action that determines the representation $r'_m = \mathbb{E}'(w'_m, \sigma'_m)$ of each changed variable $v_m$ of the set $V_3$ such that if the condition holds, $w'_m = f_m(w_m)$ and $\sigma'_k = g_m(h_m(w_m, \sigma_m))$, but if the condition does not hold, $w'_m = g_m(w_m)$ and $\sigma'_k = f_m(h_m(w_m, \sigma_m))$. Herein, $h_m$ is a mapping from $W \times \Sigma$ to W.

The action representing means 903 can be implemented by means of look-up operations. To that end, one or more look-up tables may be prepared and stored in a memory of the system. Whether the condition holds does not need to be determined explicitly by the system. Rather, an input may be received of values that determine the condition. The one or more look-up table may map these input values, together with the representations, to the corresponding changed representations. The action representing means 903 may thus be configured to cause a look-up of the representations $r'_i$ corresponding to an input regarding the condition and the representations $r_i$ using at least one look-up table that maps a tuple of the input regarding the condition and the representations $r_i$ to the corresponding representations $r'_i$.

The action representing means 903 may also be implemented by means of one or more swap operations that have been described above with reference to FIG. 3. The action representing means 903 may be configured to identify one or more input variables which determine the condition b, and may contain a first swap unit 305, a function evaluation unit 307, and/or a second swap unit 306, as described above, for each of the variables in the set of variables $V=\{v_1, v_2, \ldots, v_n\}$.

The value representing means 902 and the action representing means 903, described above, may be operatively coupled to the converting unit 601, described above. The converting unit 601 represents a nested conditional operation involving a first plurality of nested conditions by a functionally equivalent sequence of non-nested conditional operations involving a second plurality of conditions. For example, the sequence of non-nested conditional operations can be generated by the converting unit 601 by processing the nested conditional operation. Each of the resulting non-nested conditional operations can be individually represented by the action representing means 903 in the way set forth.

Figure 10:
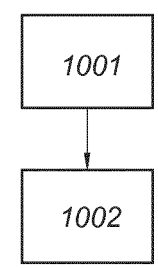
FIG. 10 is a flowchart of a method of hiding a change to a set of variables.

FIG. 10 illustrates a method of hiding a change to a set of variables $V=\{v_1, v_2, \ldots, v_n\}$ of a program. In step 1001, a value $w_i$ of a variable $v_i$ of the variables $v_1, v_2, \ldots, v_n$, wherein w is an element of a set W, is represented by a representation $r_i$, wherein $r_i = \mathbb{E}(w_i, \sigma_i)$, and $r_i$ is an element of a set of representations $\Omega(w_i)=\{\mathbb{E}(w_i,s)|s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set. In step 1002, an action on values of a subset V' of V is represented by an action on V' and an action on V\V', to obtain updated representations $r'_i = \mathbb{E}'(w'_i, \sigma'_i)$, for $i=1, 2, \ldots, n$, wherein $\mathbb{E}'$ is a one-to-one cryptographic mapping from $W \times \Sigma$ to a predetermined set, and wherein the action on V' is configured to change the representation $r_j$ of each variable $v_j$ in the set of variables V' according to a changed value $w'_j$ of variable $v_j$, and the action on V\V' is configured to change the representation $r_k$ of each variable $v_k$ in V\V' according to a changed value $\sigma'_k$ of $\sigma_k$.

It will be appreciated that the invention also applies to computer programs, particularly computer programs on or in a carrier, adapted to put the invention into practice. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each unit of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for hiding a change to a set of variables $V=\{v_1, v_2, \ldots, v_n\}$ of a program to obfuscate functional operations performed via the program, the system comprising a processor and memory to execute instructions configured to:

represent a value $w_i$ of a variable $v_i$ of the variables $v_1, v_2, \ldots, v_n$, wherein w is an element of a set W, by means of a representation $r_i$, wherein $r_i = \mathbb{E}(w_i, \sigma_i)$, and $r_i$ is an element of a set of representations $\Omega(w_i)=\{\mathbb{E}(w_i, s)|s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set; and represent an action on values of variables in a subset V' of V by means of an action on V' and an action on V\V', to obtain updated representations $r'_i = \mathbb{E}'(w'_i, \sigma'_i)$, for $i=1,2,\ldots,n$, wherein $\mathbb{E}'$ is a one-to-one cryptographic mapping from $W \times \Sigma$ to a predetermined set, and wherein (i) the action on V' changes the representation $r_j$ of each variable $v_j$ in the set of variables V' according to a changed value $w'_j$ of variable $v_j$, and (ii) the action on V\V' changes the representation $r_k$ of each variable $v_k$ in V\V' according to a changed value $\sigma'_k$ of state variable $\sigma_k$, that results in (iii) an obfuscation of which variables $v_j$ were actually changed in the program, because representations of variables $v_k$ that have not changed in the program are also altered, by changing the state variable $\sigma_k$.

2. The system of claim 1, wherein the action on the values of the variables in the subset V' comprises an if-statement, that defines an action on a set of variables $V_1$ if a condition holds, and an action on a set of variables $V_2$ if the condition does not hold, wherein the set of variables $V_1$ is a subset of the set of variables V and the set of variables $V_2$ is also a subset of the set of variables V, and wherein the instruction configured to represent the action on values of variables in a subset V' of V is further configured to use the set of variables $V_1$ as the set of variables V' if the condition holds, and to use the set of variables $V_2$ as the set of variables V' if the condition does not hold.

3. The system of claim 2, wherein the set of variables $V_1$ and the set of variables $V_2$ have an intersection $V_3$ of variables that are affected by both the action on the set of variables $V_1$ and the action on the set of variables $V_2$, so that $V_3 = V_1 \cap V_2$, wherein the action changes each variable $v_m$ of the set $V_3$ according to a function $f_m$ if the condition holds and according to a function $g_m$ if the condition does not hold, wherein the instruction configured to represent the action on values of variables in a subset V' of V is further configured to determine the representation $r'_m = \mathbb{E}'(w'_m, \sigma'_m)$ of each variable $v_m$ of the set $V_3$ such that based on whether the condition holds, either:

$$w'_m = f_m(w_m) \text{ and } \sigma'_m = g_m(h_m(w_m, \sigma_m)), \text{ or}$$

$$w'_m = g_m(w_m) \text{ and } \sigma'_m = f_m(h_m(w_m, \sigma_m)),$$

wherein $h_m$ is a mapping from $W \times \Sigma$ to W.

4. The system of claim 1, wherein the instruction configured to represent the action on values of variables in a subset V' of V is further configured to cause a look-up of the representations $r'_i$ corresponding to an input regarding the condition and the representations $r_i$ using at least one lookup table that maps a tuple of the input regarding the condition and the representations $r_i$ to the corresponding representations $r'_i$.

5. The system of claim 1, wherein $|\Sigma..=|W|$, and wherein the instruction configured to represent the action on values of variables in a subset V' of V is further configured to identify one or more input variables which determine the condition b, and wherein the instruction configured to represent the action on values of variables in a subset V' of V comprises a first swap instruction configured to perform a hidden swap operation, based on at least one representation r, wherein $r=r_i$, of a variable $v_i$ in the set V, and the one or more input variables, such that for $p \in W$ and $p \in W$ with $$r = \mathbb{E}(p, q),$$

$$r'' = \begin{cases} \mathbb{E}''(p, q) & \text{if } b \text{ holds} \\ \mathbb{E}''(q, p) & \text{if } b \text{ does not hold} \end{cases},$$

wherein $\mathbb{E}''$ is a one-to-one cryptographic mapping from $W \times \Sigma$ to a predetermined set, wherein $\mathbb{E}''$ is different from $\mathbb{E}$, wherein r'' is a representation, and/or
a second swap instruction configured to perform a hidden swap operation, based on a representation r''' and the one or more variables, such that for $p \in W$ and $q \in W$ with $$r''' = \mathbb{E}'''(p, q),$$

$$r' = \begin{cases} \mathbb{E}'(p, q) & \text{if } b \text{ holds} \\ \mathbb{E}'(q, p) & \text{if } b \text{ does not hold} \end{cases},$$

wherein $\mathbb{E}'''$ is a one-to-one cryptographic mapping from $W \times \Sigma$ to a predetermined set, wherein $\mathbb{E}'''$ is different from $\mathbb{E}'$, and r' is the updated representation $r'_i$.

6. The system of claim 5, wherein the instruction configured to represent the action on values of variables in a subset V' of V further comprises a function evaluation instruction configured to compute a function to obtain the representation r''' based on the representation r'', such that for $p \in W$ and $q \in W$ with $r'' = \mathbb{E}''(p,q)$, $$r''' = \mathbb{E}'''(f(p), g(q)),$$

wherein f is a mapping defined on W and g is a mapping defined on W.

7. The system of claim 5, wherein $\mathbb{E}''' = \mathbb{E}$ and $\mathbb{E}'' = \mathbb{E}'$.

8. The system of claim 3, wherein $h_m(w,\sigma) = \alpha$, for all values of w and a and at least one value of m in $\{1,2,3,\ldots,n\}$.

9. The system of claim 1, wherein the action on V' is configured to change the representation $r_j$ of each variable $v_j$ in the set of variables V' so that $w'_j = f_j(w_j)$ and $\sigma'_j = \sigma_j$, and
wherein the action on V\V' is configured to change the representation $r_k$ of each variable $v_k$ in V\V' so that $w'_k = w_k$ and $\sigma'_k = f_k(h_k(w_k,\sigma_k))$;
wherein $f_i$, for $i=1, 2, \ldots, n$, is a function defined on W and $h_k$, for each variable $v_k$ in V\V', is a function mapping element of $W \times \Sigma$ to W.

10. The system of claim 2, further comprising a converting instruction configured to represent a nested conditional operation involving a first plurality of nested conditions by a functionally equivalent sequence of non-nested conditional operations involving a second plurality of conditions.

11. The system of claim 10, wherein the converting instruction is further configured to
combine respective expressions of respective conditional branches of the nested conditional operation into terms of an auxiliary expression, wherein the respective expressions are associated with alternative values to be assigned to a particular variable;
repeat the step to combine respective expressions of respective conditional branches into terms of an auxiliary expression, such that a plurality of auxiliary expressions is generated in which the terms are combined in different ways,
generate code to evaluate the auxiliary expressions and store their results; and
generate code to combine the results of the auxiliary expressions in dependence on a combined condition, wherein the combined condition is a combination of the plurality of conditions, such that the terms corresponding to branches that are not relevant in view of the condition cancel out.

12. The system of claim 10, wherein the instruction configured to represent the action on values of variables in a subset V' of V is further configured (i) to identify at least one conditional operation of the sequence of non-nested conditional operations and the corresponding condition of the second plurality of conditions, and (ii) use the identified conditional operation as the action and the identified corresponding condition as the condition of the if-statement.

13. A method of hiding a change to a set of variables $V=\{v_1, v_2, \ldots, v_n\}$ of a program to obfuscate functional operations performed via the program, the method comprising:
representing, via a value representing instruction, a value $w_i$ of a variable $v_i$ of the variables $v_1, v_2, \ldots, v_n$, wherein w is an element of a set W, by a representation $r_i$, wherein $r_i = \mathbb{E}(w_i, \sigma_i)$, and $r_i$ is an element of a set of representations $\Omega(w_i) = \{\mathbb{E}(w_i, s) | s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set; and
representing, via an action representing instruction, an action on values of a subset V' of V by an action on V' and an action on V\V', to obtain updated representations $r'_i = \mathbb{E}'(w'_i, \sigma'_i)$, for $i=1, 2, n$, wherein $\mathbb{E}'$ is a one-to-one cryptographic mapping from $W \times \Sigma$ to a predetermined set, and wherein
(i) the action on V' is configured to change the representation $r_j$ of each variable $v_1$ in the set of variables V' according to a changed value $w'_j$ of variable $v_j$, and
(ii) the action on V\V' is configured to change the representation $r_k$ of each variable $v_k$ in V\V' according to a changed value $\sigma'_k$ of $\sigma_k$, that results in
(iii) an obfuscation of which variables $v_j$ were actually changed in the program, because representations of variables $v_k$ that have not changed in the program are also altered, by changing the state variable $\sigma_k$.

14. A non-transitory computer program product comprising instructions for causing a processor to perform a method of hiding a change to a set of variables $V=\{v_1, v_2, \ldots, v_n\}$ of a program to obfuscate functional operations performed via the program, the method comprising:
representing, via a value representing instruction, a value $w_i$ of a variable $v_i$ of the variables $v_1, v_2, \ldots, v_n$, wherein w is an element of a set W, by a representation $r_i$, wherein $r_i = \mathbb{E}(w_i, \sigma_i)$, and $r_i$ is an element of a set of representations $\Omega(w_i) = \{\mathbb{E}(w_i,s) | s \in \Sigma\}$, wherein $\sigma_i$ is a state variable that is an element of a set $\Sigma$ and that provides a redundancy to the representation $r_i$ of $w_i$, and $\mathbb{E}$ is a one-to-one cryptographic mapping from $W \times \Sigma$ to a predetermined set; and representing, via an action representing instruction, an action on values of a subset V' of V by an action on V' and an action on V\V', to obtain updated representations $r'_i = \mathbb{E}'(w'_i, \sigma'_i)$, for i=1, 2, n, wherein $\mathbb{E}'$ is a one-to-one cryptographic mapping from $W \times \Sigma$ to a predetermined set, and wherein (i) the action on V' is configured to change the representation $r_j$ of each variable $v_j$ in the set of variables V' according to a changed value $w'_j$ of variable $v_j$, and (ii) the action on V\V' is configured to change the representation $r_k$ of each variable $v_k$ in V\V' according to a changed value $\sigma'_k$ of $\sigma_k$, that results in (iii) an obfuscation of which variables $v_j$ were actually changed in the program, because representations of variables $v_k$ that have not changed in the program are also altered, by changing the state variable $\sigma_k$.

\* \* \* \* \*